May 12, 1931. G. E. DANIELSON 1,804,747
GEAR SHIFT
Filed Feb. 5, 1930. 2 Sheets-Sheet 2

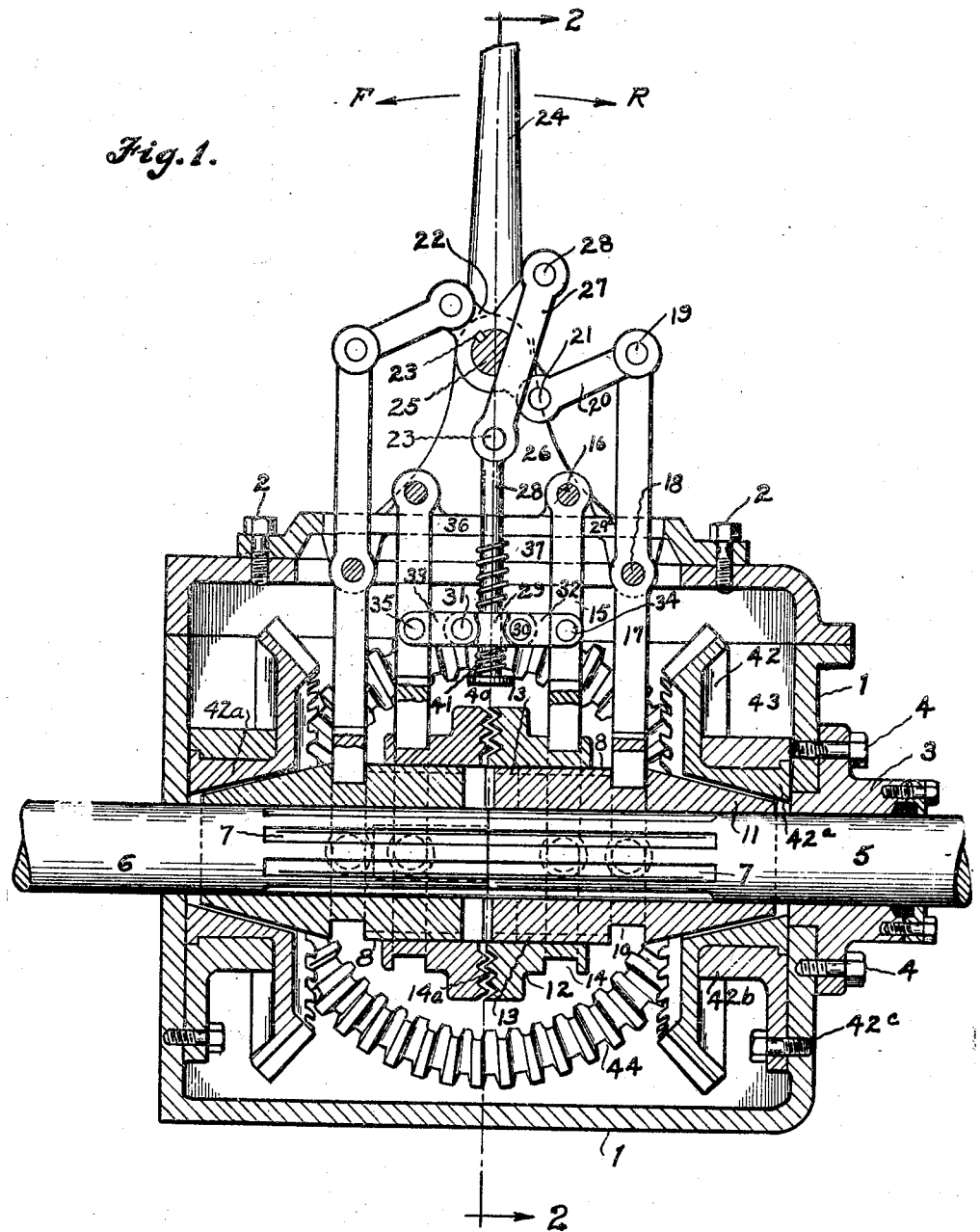

INVENTOR
Gustav E. Danielson
BY Frederick P. Gorin
ATTORNEY

Patented May 12, 1931

1,804,747

UNITED STATES PATENT OFFICE

GUSTAV E. DANIELSON, OF SEATTLE, WASHINGTON, ASSIGNOR OF ONE-FOURTH TO ADOLPH BOHM, OF SEATTLE, WASHINGTON

GEAR SHIFT

Application filed February 5, 1930. Serial No. 426,154.

This invention relates to improvements in gear transmission and particularly to such transmissions as are adapted to motor craft, such as a motor boat and the like. The principal object of the invention is to provide a device of this character which enables the operator to shift to either forward or reverse by a simple movement of a lever or other such member, the propeller shaft and the engine shaft being first automatically brought into frictional engagement and followed by automatic means which places these two shafts in positive engagement.

I accomplish these and other objects by the peculiar arrangement and combination of the parts as will be more fully explained in the following specification, shown in the accompanying drawings and finally pointed out in the appended claims.

In the drawings: Fig. 1 is a vertical central sectional view.

Figures 2, 3:
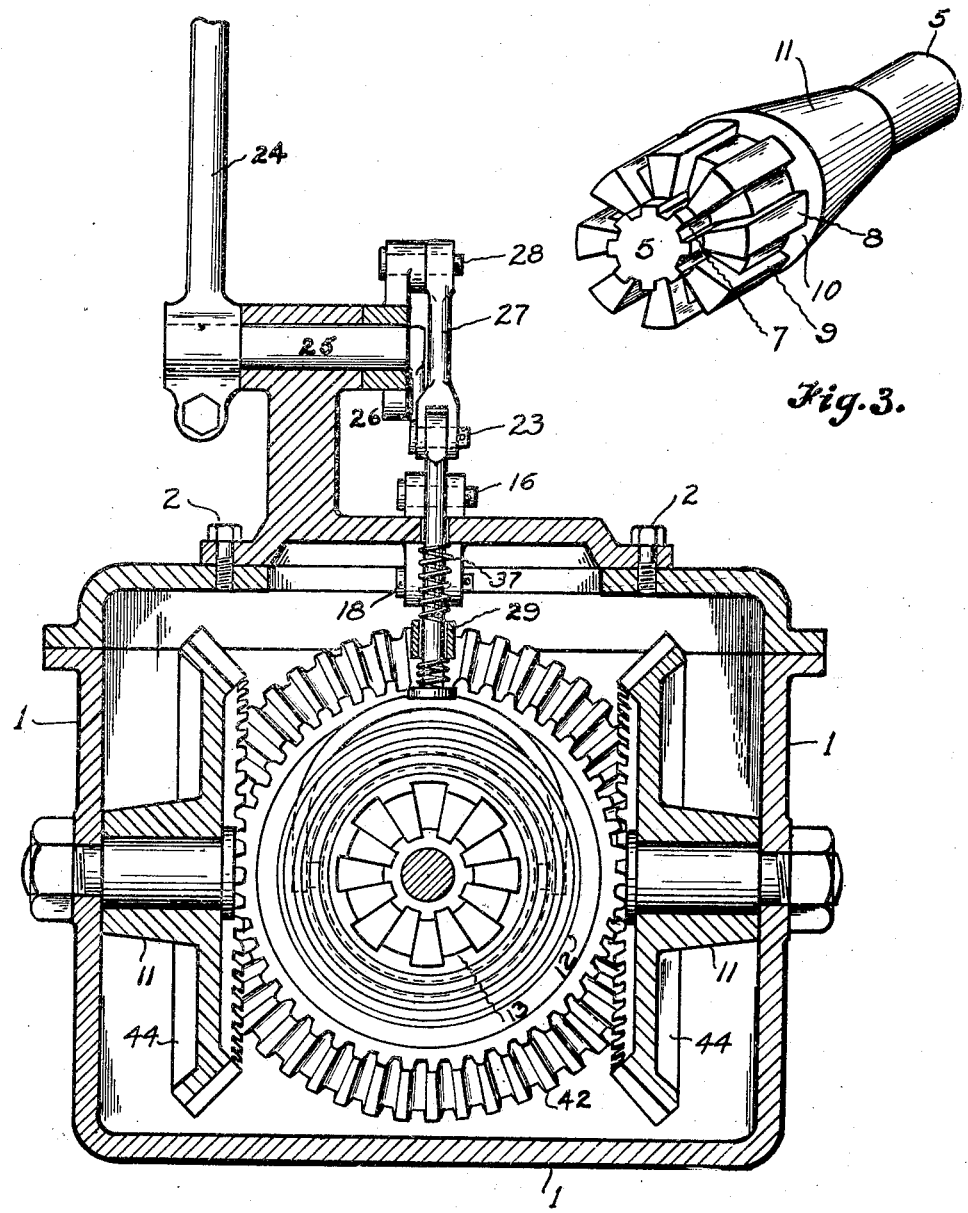
Fig. 2 is a similar view taken upon the line 2—2 of Fig. 1.
Fig. 3 is an enlarged detailed view showing the hub, propeller shaft, and clutch mechanism.

Referring now more particularly to the drawings, reference numeral 1 indicates the housing, which is preferably in the form of a casting, with the parts jointed together as by bolts 2. The device is symmetrical, therefore a description of the device upon one side of the center will describe that portion upon the other side. 3 is a casting secured to the housing 1 by means of bolts 4. The casting is bored through to revolubly receive a propeller shaft 5. 6 is the engine shaft. The ends of the shafts are channeled as at 7. 8 indicates a hub which is also channeled as at 9, and has an annular channel 10 terminating in the male portion 11 of a cone clutch, the hub being slidably mounted upon its shaft. 12 is a ring having inwardly projecting teeth 13, which are adapted to slide within the channels 9 of the hub. The face of the ring 12 has teeth 14a formed upon it and also has an annular channel 14 into which projects the lower end of a lever 15, pivoted at 16 to the casting 1. The lower end of a similar lever 17 projects into the annular channel 10 of the hub 8. The lever 17 is pivoted at 18 to the casting 1 and its upper end is pivoted at 19 to one end of a link 20, whose opposite end is pivoted at 21 to a member 22, which is keyed at 23 to a lever 24 pivoted upon a shaft 25 rotative within a journal bearing 26, rigid with the housing 1. 27 is another link having one of its ends pivoted at 28a to the member 22 and its opposite end pivoted at 23 to the upper end of a rod 28, which passes downwardly through a central link 29, whose ends are pivoted at 30 and 31 to outer links 32 and 33 respectively, the ends of the outer links being pivoted at 34 and 35 to the lever 15 and a similar lever 36 respectively. 37 is a spring thrust between the link 29 and the top of the housing. The rod 28 is provided with a head 40, between which and the center link is a spring 41, which is much weaker than the spring 37. 42 is a miter gear whose hub, 42—a, is bored out in conical formation as shown to form the female portion of a cone clutch, of which the part 11 forms the male portion. The hub is revoluble within bearing 42—b, secured as by bolts 42—c, to the housing 1.

The operation of the device is that,—assuming that the operator intends to shift the gears so as to drive the boat or other vehicle in its forward course, indicated by the arrow marked F. To do this the operator merely moves the lever 24 around its center of movement and in the direction indicated This causes the rotation of the member 22 in the same direction, as well as a movement of the outer end of the link 27, with the result that the rod 28 is forced upwardly carrying the central link 29 with it, causing the inner ends of the links 32 and 33 to move upwardly with a resultant movement towards the center of the lower ends of the levers 15, which of course, forces the rings 12 towards each other into frictional engagement. The engine shaft now of course rotates the propeller shaft 5 through this frictional engagement and upon a continued movement of the lever 24 in the direction indicated, the lower ends of the levers 17, moving about their pivots 18, will cause the two hubs 8 to move towards each other, and finally the teeth 13 of one of the hubs to enter the channels 9 of the other hub, which sets up a positive drive between the engine shaft 6 and the propeller shaft 5. A movement of the lever in the direction of the arrow marked R in Fig. 1 will cause a reverse movement. This reverse action is caused by the inward movement of the link 20 which results in a like movement of the upper end of the levers 17 about their center 18, and an outward movement of the lower ends of those levers which carries the hubs 8 outwardly and into frictional engagement of the male and female portions of the cone clutches, which, through the miter gear 44, causes the engine shaft 6 to rotate the propeller shaft 5.

While I have shown and described a particular form of embodiment of my invention, I am aware that many minor changes will readily suggest themselves to those skilled in the art without departing from the spirit and scope of my invention.

Having described my invention what I claim as new and desire to protect by Letters Patent is:—

1. In a gear shift mechanism the combination of a casing, a drive shaft and a driven shaft revoluble therein, means adapted to positively connect the two shafts, means to frictionally connect them, a lever for automatically first throwing into engagement the frictional means and later to throw into engagement the positive means for rotation of the shafts in one direction, another frictional means including a pair of clutches adapted to connect the two shafts and power transmission means between the pair of clutches for accomplishing said connection for rotation of the shafts in the opposite direction.

2. In a gear shift, the combination of a casing, a drive shaft and a driven shaft mounted therein, cooperating positive clutch members mounted on the inner ends of the drive and driven shafts, friction clutch members associated with the positive clutch members and arranged to be engaged prior to engagement of the positive clutch members, an operating lever, levers and links between the operating lever and the positive clutch members, links and levers between the friction clutch members and the operating lever, whereby upon manipulation of the operating lever the friction clutch members will first connect the shafts and upon further movement of the operating lever the positive clutch member on the shafts will be engaged.

3. In a gear shift, the combination of a casing, a drive shaft and a driven shaft mounted therein, cooperating positive clutch members mounted on the inner ends of the drive and driven shafts, friction clutch members associated with the positive clutch members and arranged to be engaged prior to engagement of the positive clutch members, an operating lever, levers and links between the operating lever and the positive clutch members, links and levers between the friction clutch members and the operating lever, whereby upon manipulation of the operating lever the friction clutch members will first connect the shafts and upon further movement of the operating lever the positive clutch member on the shafts will be engaged, transmission gears mounted in the casing and having clutching faces with which the positive clutch members cooperate, other transmission gears mounted in the casing and meshing with the first mentioned transmission gears, whereby upon reverse operation of the operating lever the friction and positive clutch members are disengaged and the positive clutch members engaged with the clutch faces in the transmission gears to reverse the driven shaft.

4. In a gear shift, the combination of a casing, a drive shaft and a driven shaft mounted therein, cooperative positive clutch members mounted on the inner end of the shafts, each of said members having a clutch element at opposite ends, cooperating friction clutch members mounted on the positive clutch members arranged to be engaged prior to engagement of the cooperating positive clutch members, transmission gears mounted in the casing and each having a clutch face to cooperate with the clutch element on the outer end of the positive clutch members, other transmission gears meshing with the first mentioned transmission gears, an operating lever, means between the operating lever and the friction clutch members to operate the latter, and means between the operating lever and the positive clutch members to operate the latter after the friction clutch members are engaged, whereby to drive the shafts in the same direction, reversal of the movement of the operating lever causing disconnection of the friction and positive clutch members and causing engagement of the clutch elements on the ends of the positive clutch members to engage the clutch faces in the transmission gears to reverse the motion of the driven shaft.

In testimony whereof I affix my signature.

GUSTAV E. DANIELSON.